United States Patent
Kim et al.

(10) Patent No.: US 9,349,497 B2
(45) Date of Patent: *May 24, 2016

(54) ELECTRODE ACTIVE MATERIAL HAVING CORE-SHELL STRUCTURE

(71) Applicant: LG Chem, Ltd., Seoul (KR)

(72) Inventors: Jeyoung Kim, Daejeon (KR); Taeyeon Kim, Seoul (KR); Seo-Jae Lee, Daejeon (KR); Wonseok Chang, Gyeonggi-do (KR); Seungyoun Choi, Gyeonggi-do (KR)

(73) Assignee: LG Chem, Ltd. (KR)

( * ) Notice: Subject to any disclaimer, the term of this patent is extended or adjusted under 35 U.S.C. 154(b) by 235 days.

This patent is subject to a terminal disclaimer.

(21) Appl. No.: 14/100,590

(22) Filed: Dec. 9, 2013

(65) Prior Publication Data

US 2014/0099546 A1    Apr. 10, 2014

Related U.S. Application Data

(63) Continuation of application No. 12/670,798, filed as application No. PCT/KR2008/004360 on Jul. 25, 2008, now Pat. No. 8,632,698.

(30) Foreign Application Priority Data

Jul. 26, 2007   (KR) .................. 10-2007-0075337
Jul. 26, 2007   (KR) .................. 10-2007-0075339

(51) Int. Cl.
*H01B 1/20*   (2006.01)
*H01M 4/13*   (2010.01)
(Continued)

(52) U.S. Cl.
CPC . *H01B 1/20* (2013.01); *H01M 4/13* (2013.01); *H01M 4/133* (2013.01); *H01M 4/366* (2013.01); *H01M 4/62* (2013.01); *H01M 10/052* (2013.01); *Y02E 60/122* (2013.01)

(58) Field of Classification Search
CPC .............. H01B 1/00; H01B 1/20; H01B 1/22; H01B 1/24; H01M 4/131; H01M 4/137; H01M 4/362–4/366; H01M 4/525; H01M 4/622–4/624

See application file for complete search history.

(56) References Cited

U.S. PATENT DOCUMENTS

| 4,808,496 A | 2/1989 | Hope et al. |
| 6,235,427 B1 | 5/2001 | Idota et al. |

(Continued)

FOREIGN PATENT DOCUMENTS

| CN | 1073302 A | 6/1993 |
| CN | 1400682 A | 3/2003 |

(Continued)

OTHER PUBLICATIONS

International Search Report, PCT/KR2008/004360, dated Jan. 9, 2009.

(Continued)

*Primary Examiner* — Mark Kopec
(74) *Attorney, Agent, or Firm* — Lerner, David, Littenberg, Krumholz & Mentlik, LLP

(57) ABSTRACT

Disclosed is an electrode active material having a core-shell structure, which includes: (a) a core capable of intercalating and deintercalating lithium ions; and (b) a shell including a polymer or an oligomer having a glass transition temperature of 25° C. or less when impregnated with an electrolyte, wherein a surface of the core is coated with the shell. Also, an electrode manufactured by using the electrode active material and a secondary battery including the electrode are disclosed. The shell (b) suppresses the formation of an SEI layer during initial charge of a battery, and prevents initial capacity reduction.

4 Claims, 3 Drawing Sheets

(51) Int. Cl.
  *H01M 4/133* (2010.01)
  *H01M 4/36* (2006.01)
  *H01M 4/62* (2006.01)
  *H01M 10/052* (2010.01)

(56) References Cited

U.S. PATENT DOCUMENTS

| | | | |
|---|---|---|---|
| 6,878,487 B2 | 4/2005 | Cho et al. | |
| 7,700,226 B2 * | 4/2010 | Yong | H01M 2/1673 29/623.5 |
| 8,440,351 B2 | 5/2013 | Jung et al. | |
| 8,632,698 B2 * | 1/2014 | Kim | H01M 4/133 252/506 |
| 2003/0049529 A1 | 3/2003 | Cho et al. | |
| 2003/0157407 A1 | 8/2003 | Kosuzu et al. | |
| 2005/0118508 A1 | 6/2005 | Yong et al. | |
| 2006/0040183 A1 | 2/2006 | Jiang et al. | |
| 2006/0166091 A1 | 7/2006 | Deguchi et al. | |
| 2012/0321950 A1 | 12/2012 | Okumura et al. | |

FOREIGN PATENT DOCUMENTS

| | | |
|---|---|---|
| CN | 1567617 A | 1/2005 |
| CN | 1725532 A | 1/2006 |
| CN | 1790799 A | 6/2006 |
| CN | 1801521 A | 7/2006 |
| CN | 1875504 A | 12/2006 |
| CN | 1918727 A | 2/2007 |
| EP | 0880186 A1 | 11/1998 |
| EP | 1313158 A2 | 5/2003 |
| JP | H05275077 A | 10/1993 |
| JP | 09219197 A | 8/1997 |
| JP | 11-329436 A | 11/1999 |
| JP | 2000-251895 A | 9/2000 |
| JP | 2001176498 A | 6/2001 |
| JP | 2001223031 A | 8/2001 |
| JP | 2002246020 A | 8/2002 |
| JP | 2003012311 A | 1/2003 |
| JP | 2003217594 A | 7/2003 |
| JP | 2004185810 A | 7/2004 |
| JP | 2006-520082 T | 8/2006 |
| KR | 20000056985 A | 9/2000 |
| KR | 20050000353 A | 1/2005 |
| KR | 20060071386 A | 6/2006 |
| KR | 2007-0041900 A | 4/2007 |
| KR | 20070016431 A | 8/2008 |

OTHER PUBLICATIONS

Office Action from corresponding Korean Patent Application No. 10-2008-0073241 issued Aug. 26, 2010.
Song et al., Journal of Power Sources, 77; 183-197 (1999).
"Polymer Data Handbook (extracts from)," pp. 542-552, 998-1 003 In: James E. Mark: "Polymer Data Handbook," Jan. 1, 1999, Oxford University Press, XP055054136, ISBN: 978-0-19-518101-2.
Wang, Jinjian, et al., "Some Insight into Stability of Amorphous Poly(ethylene glycol) Dimethyl Ether Polymers Based on Molecular Dynamics Simulations," The Journal of Physical Chemistry Letters, vol. 4, No. 10, May 16, 2013, pp. 1718-1722, XP055118271, ISSN: 1948-7185, DOI:10.1021/jz400885.
"Application Note—Thermal Analysis—Tg and Melting Point of a Series of Polyethylene Glycols Using the Material Pocket", Jan. 1, 2011, XP055093631, Perkin Elmer, Inc. 940 Winter Street. Waltham, MA 02451. USA.

* cited by examiner

ELECTRODE ACTIVE MATERIAL HAVING CORE-SHELL STRUCTURE

CROSS REFERENCE TO RELATED APPLICATIONS

The present application is a continuation of U.S. application Ser. No. 12/670,798 (filed Feb. 1, 2011, and now issued as U.S. Pat. No. 8,632,698), which is a national phase entry under 35 U.S.C. §371 of International Application No. PCT/KR2008/004360, filed Jul. 25, 2008, published in English, which claims the benefit of Korean Patent Application Nos. 10-2007-0075337, filed Jul. 26, 2007 and 10-2007-0075339, filed Jul. 26, 2007. The disclosures of said applications are incorporated by reference herein.

TECHNICAL FIELD

The present invention relates to an electrode active material designed to improve the initial capacity of a battery, stabilize an electrochemical property during charge/discharge, and maintain a high capacity.

BACKGROUND ART

There has been recently increasing interest in energy storage technology. Electrochemical devices have been widely used as energy sources in portable phones, camcorders, notebook computers, PCs and electric cars, resulting in intensive research and development. In this regard, electrochemical devices are subjects of great interest. Particularly, development of rechargeable secondary batteries has been the focus of attention. Also, in developing such batteries, research on design of a novel electrode and a novel battery has been recently conducted in order to improve capacity density and specific energy.

Among the currently used secondary batteries, lithium secondary batteries, developed in early 1990's, generally have drive voltage and energy density higher than those of conventional batteries using aqueous electrolytes such as batteries, Ni—Cd batteries, $H_2SO_4$—Pb batteries, etc., and thus they are spotlighted in the field of secondary batteries.

A lithium secondary battery may be generally manufactured by using a cathode and an anode, which include electrode active materials capable of intercalating/deintercalating lithium ions, and an electrolyte functioning as conduction medium of the lithium ions. Meanwhile, the lithium secondary battery is rechargeable and dischargeable because lithium ions coming out from a cathode active material during a charge process are intercalated into an anode active material, and deintercalated during a discharge process, so that the lithium ions run between both electrodes while serving to transfer energy.

However, in the lithium secondary battery, there is a problem in that during charge/discharge, side reactions occur within the battery by decomposition of a nonaqueous electrolyte solution functioning as an electrolyte, particularly, a carbonate organic solvent, on an electrode surface. Also, when an electrolyte solvent having a large molecular weight, such as ethylene carbonate (EC), propylene carbonate (PC), etc. is co-intercalated between graphite layers of a carbon-based anode, the structure of the anode may be broken down.

It has been known that the above mentioned problems can be solved by a solid electrolyte interface (SEI) layer formed on the anode surface during initial charge of a battery, the SEI layer allowing lithium ions to pass while functioning as a protective layer of the anode surface.

Meanwhile, it is assumed that the SEI layer is formed by reduction of an electrolyte component, a reaction between an electrolyte and a carbon-based anode active material, etc. during initial charge, but lithium ions within a battery irreversibly participate in the formation, thereby reducing the initial capacity of the battery. Accordingly, it is difficult to achieve a high capacity battery.

As an anode active material, a carbon material is mainly used. When a carbon material is used, a high voltage battery can be achieved due to a low potential vs. lithium potential, but it is difficult to achieve a high capacity battery due to a maximum theoretical capacity of only about 370 mAh/g.

As an attempt to achieve a high capacity battery, a method of substituting the carbon electrode active material by a metal or a metalloid-based active material having a high electric capacity, such as Si, has been researched. However, when the metal(loid)-based active material is used, the volume significantly changes according to intercalation/deintercalation of lithium ions, thereby causing problems to be solved, such as cyclability degradation by decomposition of the active material, battery stability degradation by gas generation in a large amount during charge/discharge, etc.

DISCLOSURE

Technical Problem

In the process of solving the problem of initial capacity reduction in a secondary battery, the inventors of the present invention invented introduction of an electrode active material having a core-shell structure, instead of a conventional electrode active material, the core-shell structure including (a) a core capable of intercalating and deintercalating lithium ions, and (b) a shell including a specific polymer or a specific oligomer.

More specifically, the inventors found that when a polymer or an oligomer (having a glass transition temperature of 25° C. or less when impregnated with an electrolyte) is used for the shell (b), the shell (b) can prevent initial capacity reduction by suppressing the formation of an SEI layer during initial charge of a battery, and can cover functions of a conventional SEI. Also, it has been known that the shell (b) can have sufficient elasticity in an operating temperature range of a battery, and thus is not easily broken down by a core volume change caused by charge/discharge of a battery, and thereby can contribute to improvement of battery stability.

Also, the inventors found that in using a metal(loid) based active material, such as Si, as an electrode active material, when an electrode active material of core-shell structure including a shell (b) coated on the surface of the metal(loid) based active material is used, gas generation during charge/discharge of a battery is minimized, thereby solving the problem of battery stability reduction caused by the use of the metal(loid) based active material. Herein, the shell includes a polymer or an oligomer having a glass transition temperature of 25° C. or less when impregnated with an electrolyte.

The present invention is based on this finding.

Technical Solution

In accordance with an aspect of the present invention, there is provided an electrode active material having a core-shell structure, which includes: (a) a core capable of intercalating and deintercalating lithium ions; and (b) a shell including a polymer or an oligomer having a glass transition temperature of 25° C. or less when impregnated with an electrolyte, wherein a surface of the core is coated with the shell.

Also, the present invention provides an electrode manufactured by using the electrode active material.

Also, the present invention provides a secondary battery including the electrode.

Hereinafter, the present invention will be described in detail.

An electrode active material of the present invention is characterized by having a core-shell structure in which, on the surface of a core (a) capable of intercalating and deintercalating lithium ions, a shell (b) including a polymer or an oligomer (having glass transition temperature of 25° C. or less when impregnated with an electrolyte) is coated.

The core (a) can repeatedly intercalate/deintercalate lithium ions, which allows a battery to be charged/discharged. Also, the core (a) includes a metal(loid) having a high electric capacity, and thus it is possible to achieve a high capacity battery.

In the present invention, the shell (b) is impregnated with an electrolyte, and thus does not prevent the lithium ions from moving into the core (a). Also, the shell (b) can suppress formation of an SEI layer during initial charge, and thus prevent the initial capacity of the battery from being reduced, and thereby maximize a battery capacity. Also, the shell (b) can minimize gas generation during charge/discharge of the battery, thereby improving the stability of the battery.

In general, an electrolyte transfers lithium ions between a cathode and an anode during charge/discharge of a battery, and may form a passivation layer (SEI layer) on the surface of an anode active material by reacting with lithium ions within the battery during initial charge.

However, in general, in operation of a secondary battery, the reduction of an electric capacity occurs during an initial cycle. It is assumed that this is because the formation of an SEI layer during initial charge of the battery consumes many lithium ions within an electrolyte. Especially, such initial capacity reduction is more problematic in a carbon-based electrode active material having a small theoretical capacity.

Also, the SET layer usually includes an inorganic material such as LiF, $Li_2CO_3$, etc., and thus cannot resist a change in volume of an electrode active material, caused by intercalation and deintercalation of lithium ions during charge/discharge of a battery. Accordingly, on the SEI layer, a crack may occur, and through the crack, an anode active material and an electrolyte may continuously contact/react with each other, thereby reducing battery performance. Specifically, during the reaction of the anode active material and the electrolyte, the electrolyte may be decomposed, and thus may continuously generate gas such as $CO_2$. Then, the gas may reduce the stability of the battery, and increase the thickness of the battery, resulting in a problem in sets such as cellular phones, notebook PCs, etc. Especially, such a problem is more significant when a metal(loid)-based electrode active material, whose volume is changeable up to 200-300% by intercalation/deintercalation of lithium ions, is used.

However, according to the present invention, the shell (b) suppresses direct contact with the core (a) capable of intercalating/deintercalating lithium ions and a non aqueous electrolyte, and thus the formation of an SEI layer during initial charge of a battery can be prevented. Accordingly, in the present invention, it is possible to prevent an initial capacity of the battery from being reduced, and to maximize the capacity of an electrode active material.

Also, in the present invention, the shell (b) can cover the functions of a conventional SEI layer because the shell is impregnated with an electrolyte, thereby transferring lithium ions to the core (a), and protects the core (a), thereby suppressing side reactions between the core and the electrolyte.

Although an SEI layer can be formed on the surface of the core (a) in the Present invention, the shell (b) impregnated with an electrolyte protects the SET layer or blocks the SEI layer from the outside, reducing the occurrence of a crack on the SEI layer. Accordingly, in the present invention, it is possible to suppress a side reaction between an electrode active material and an electrolyte, and to minimize gas generation.

Meanwhile, during charge/discharge of a battery, the core (a) intercalates/deintercalates lithium ions, which may significantly cause a change in volume. Accordingly, when a polymer or an oligomer which lacks chain flexibility in an operating temperature range of the battery (for example, a polymer or an oligomer having a glass transition temperature of 25° C. or more when impregnated with an electrolyte) is used as a component for the shell (b), without consideration of such a volume change, the shell (b) cannot stand the volume change of the core, and thus a crack may occur. Thus, the cyclability and stability of the battery may be reduced.

However, in the present invention, the shell (b) includes a polymer or an oligomer which has a glass transition temperature of 25° C. or less when impregnated with an electrolyte, and thus can have sufficient elasticity in an operating temperature range of a battery. Accordingly, the shell (b) of the present invention, which functions as a protective layer for the core, is not easily broken down by a core volume change caused by charge/discharge of a battery, and thereby can contribute to improvement of battery stability.

In the present invention, a carbon number, a substitute, a monomer, etc. of a material for the shell (b) are not particularly limited, as long as the material includes a polymer or an oligomer having a glass transition temperature of 25° C. or less when impregnated with an electrolyte. Herein, the electrolyte is a conventionally known in the art, and is applied to a battery manufactured according to the present invention.

Also, although a battery is generally operated at about room temperature (25° C.), the polymer or the oligomer preferably has a glass transition temperature of −20° C. or less when impregnated with an electrolyte in consideration of operation at a temperature lower than the room temperature.

Also, in the shell (b), the polymer or the oligomer preferably includes an ether (—O—) group. The ether group included in the polymer or the oligomer selectively conducts lithium ions by chemically bonding to an adjacent ether group and lithium ion, thereby facilitating the movement of the lithium ions to the core (a). Non-limiting examples of the polymer or the oligomer including an ether group (—O—) include polyethylene glycol, polyethylene oxide, polyethylene glycol methyl ether, polyethylene glycol dimethyl ether, poly propylene oxide, polyethylene, polypropylene, polyisobutylene, polyvinylidene chloride, etc. and the materials may be used alone or in combination.

Also, the thickness of the shell (b) is preferably within a range of 0.001 μm to 1 μm. If the thickness is less than 0.001 μm, a battery performance improving effect is not significant, and if the thickness is greater than 1 μm, the movement of lithium ions to the core (a) may be prevented.

Meanwhile, there is no limitation in the core that may be used in the present invention, as long as the core can intercalate or deintercalate lithium ions. It is possible to use, as the core, a material for a conventional electrode active material, preferably a material for an anode active material, which can be used for an electrode of a conventional secondary battery, preferably an anode.

Examples of the anode active material include a carbon material, such as carbon, petroleum coke, activated carbon, graphite, carbon fiber, etc., or a metal, oxide. Non-limiting examples of the metal oxide include $TiO_2$, $Li_4Ti_5O_{12}$, etc., which have potential vs. lithium potential of less than 2V. The materials may be used alone or in combination.

Also, there is no limitation in the core (a) that may be used in the present invention, as long as the core is a metal(loid) material that can intercalate/deintercalate lithium ions, and includes a metal or a metalloid.

Non-limiting examples of the metal(loid) material include (i) a metal or a metalloid selected from the group including Si, Al, Sn, Sb, Bi, As, Ge, Pb, and Li; (ii) an oxide of the metal or the metalloid selected from the group (i); an alloy of at least two metals or metalloids selected from the group (i); (iv) a composite of a carbon material with the metal or the metalloid selected from the group (i); or (v) a composite of a carbon material with the oxide of the metal or the metalloid selected from the group (i), etc. and the materials may be used alone or in combination.

An electrode active material of the present invention may be prepared by a polymer coating method conventionally known in the art, and an embodiment of the method may include the steps of: i) adding a core forming material in dispersion including a polymer or an oligomer (for forming a shell) and a solvent; stirring the solution obtained from step i); and separating an electrode active material having a core-shell structure from the solution obtained from step ii).

In step i), the weight ratio of the polymer or the oligomer (for forming a shell) to the core forming material ranges from 0.01:99.99 to 10:90, and the materials are preferably included in an amount of 0.01 to 10 parts by weight, respectively, with respect to 100 parts by weight of a solution. If any one of the polymer or the oligomer (for forming a shell) and the core forming material is included in an excessive amount, it is difficult to thinly and uniformly form the shell on the surface of the core.

Also, the solvent in step i) is not particularly limited as long as the solvent can be used in a conventional compound preparation process. Non-limiting examples of the solvent include a hydrophilic solvent, such as water, methyl alcohol, ethyl alcohol, isopropyl alcohol, etc., an organic polar solvent, such as methylene chloride, acetonitrile, ethyl acetate, methyl ethyl ketone, chloroform, chlorobenzene, dimethylacetamide, dimethyl formamide, dimethyl sulioxide, etc., and organic non-polar solvent, such as pentane, hexane, heptane, diethyl ether, toluene, benzene, xylene, cyclohexane, cyclopentane, carbon tetrachloride, tetrahydrofuran, etc. The materials may be used alone or in combination.

The stirring in step is preferably carried out for 1 minute to 12 hours. If the stirring time is too short, it is difficult to form the shell on the surface of the core, and also stirring for an excessive time is not advantageous in shell formation.

The separating in step iii) may be carried out by a method conventionally known to a skilled person in the art, for example, a centrifugal process.

Also, the present invention provides an electrode manufactured by using an electrode active material having the core-shell structure, preferably an anode.

The electrode according to the present invention may be manufactured by a conventional method known in the art, except that a core-shell electrode active material prepared according to the present invention is used. In one embodiment of such conventional methods, slurry is prepared by mixing and agitating the core-shell electrode active material and a solvent, optionally with a binder, a conductive agent and a dispersant, and then the slurry is applied (coated) onto a metallic current collector, followed by compressing and drying. Herein, the weight ratio of the binder to the electrode active material may range from 1 to 10, and the weight ratio of the conductive agent to the electrode active material may range from 1 to 30.

The metallic current collector includes a metal with high conductivity. Any metal to which the electrode active material slurry can be adhered with ease can be used as long as it shows no reactivity in the drive voltage range of a battery using the same. Non-limiting examples of the cathode current collector may include a foil made of aluminum, nickel, or a combination thereof. And non-limiting examples of the anode current collector may include a foil made of copper, gold, nickel, copper alloy, or a combination thereof.

Examples of the binder that may be used in the present invention include polytetrafluoroethylene (PTFE), polyvinylidene fluoride (PVdF), etc.

There is no particular limitation in the conductive agent, as long as the conductive agent is an electron conductive material that causes no chemical change in a secondary battery. In general, the conductive agent that may be used in the present invention includes carbon black, graphite, carbon fibers, carbon nanotubes, metal powder, conductive metal oxides, organic conductive agents, or the like. Commercially available conductive agents include acetylene black-based conductive agents (available from Chevron Chemical Company or Gulf Oil Company), Ketjen Black EC series (available from Armak Company), Vulcan XC-72 (available from Cabot Company) and Super P (available from MMM Co.).

Non-examples of the solvent in manufacture of the electrode include an organic solvent, such as N-methyl-2-pyrrolidone (NMP), dimethyl formamide (DMF), acetone, dimethylacetamide, etc., or water, and the solvents may be used alone or in combination. The solvent is used in an amount enough to dissolve and disperse the electrode active material, the binder, and the conductive agent, in consideration of the thickness of the applied slurry, and the yield.

Furthermore, the present invention provides a secondary battery which includes the electrode according to the present invention, preferably a secondary battery which includes a cathode, an anode manufactured according to the present invention, a separator, and an electrolyte.

Non-limiting examples of the secondary battery include a lithium metal secondary battery, a lithium ion secondary battery, a lithium polymer secondary battery, or a lithium ion polymer secondary battery.

The cathode that may be employed in the secondary batter of the present invention is not particularly limited, and may be manufactured by adhering a cathode active material to a cathode current collector, according to a conventional method known in the art. The cathode active material may include a conventional cathode active material that may be used in a cathode of a conventional secondary battery, and non-limiting examples of the cathode active material may include, a lithium transition metal composite oxide such as $LiM_xC_y$, (M=Co, Ni, Mn, $Co_aNi_bMn_c$) (for example, lithium manganese composite oxide such as $LiMn_2O_4$, lithium nickel oxide such as $LiNiO_2$, lithium cobalt oxide such as $LiCoO_2$, lithium iron oxide, oxides substituted with other transition metals, lithium containing vanadium oxide, etc), chalcogenide (for example, manganese dioxide, titanium disulfide, molybdenum disulfide, etc.), etc. Preferably, the examples include $LiCoO_2$, $LiNiO_2$, $LiMnO_2$, $LiMn_2O_4$, $Li(Ni_aCo_b-Mn_c)O_2$ ($0<b<1$, $0<c<1$, $a+b+c=1$), $LiNi_{1-y}Co_yO_2$, $LiCo_{1-y}Mn_yO_2$, $LiNi_{1-y}Mn_yO_2$ (provided that, $0 \le Y<1$), $Li(Ni_aCo_bMn_c)O_4$ ($0<a<2$, $0<b<2$, $0<c<2$, $a+b+c=2$) $LiNn_{2-z}Ni_zO_4$, $LiMn_{2-z}Co_zO_4$ (provided that, $0<Z<2$), $LiCoPO_4$, $LiFePO_4$, or a mixture thereof. Non-limiting examples of the cathode current collector include foil, etc., obtained from aluminum, nickel, or a combination thereof.

The electrolyte is a conventional electrolyte known in the art, and may include an electrolyte salt, and an electrolyte solvent. There is no particular limitation in the electrolyte salt, as long as the electrolyte salt is generally used for a non-aqueous electrolyte. Non-limiting examples of an electrolyte salt, which can be used in the present invention, include salts having a structure such as $A^+B^-$, wherein $A^+$ contains an ion selected from among alkaline metal cations, such as $Li^+$, $Na^+$ and $K^+$, and combinations thereof, and $B^-$ contains an ion selected from among anions, such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, and combinations thereof. Particularly, a lithium salt is preferred. The electrolyte salts may be used alone or in combination.

There is no particular limitation in the electrolyte solvent, as long as the electrolyte solvent is generally used as an organic solvent for a non aqueous electrolyte, and examples of the electrolyte solvent may include a cyclic carbonate, a linear carbonate, lactone, ether, ester, sulfoxide, acetonitrile, lactam, and/or ketone. Examples of the cyclic carbonate include ethylene carbonate (EC), propylene carbonate (PC), butylene carbonate (BC), fluoroethylene carbonate (FEC), etc.; and examples of the linear carbonate include diethyl carbonate (DEC), dimethyl carbonate (DMC), dipropyl carbonate (DPC), ethyl methyl carbonate (EMC), methyl propyl carbonate (MPC), etc. Examples of the lactone include gamma-butyrolactone (GBL); and examples of the ether include dibutyl ether, tetrahydrofuran, 2-methyltetrahydrofuran, 1,4-dioxane, 1,2-dimethoxyethane, 1,2-diethoxyethane, etc. Examples of the ester include methyl formate, ethyl formate, propyl formate, methyl acetate, ethyl acetate, propyl acetate, methyl propionate, ethyl propionate, butyl propionate, methyl pivalate, etc. Also the sulfoxide may include dimethyl sulfoxide; the lactam may include N-methyl-2-pyrrolidone (NMP); and the ketone may include polymethylvinyl ketone. Also, a halogen derivative of the organic solvent may be used. The organic solvents may be used alone or in combination.

A separator which can be used in the present invention is not limited to any specific separator, but a porous separator is preferred, and non-limiting examples thereof include porous polypropylene, polyethylene or polyolefin separators.

The secondary battery according to the present invention may be obtained according to a conventional method known in the art. For example, the battery may be obtained by interposing a separator between an anode and a cathode and injecting an electrolyte thereto.

There is no particular limitation in the outer shape of the secondary battery according to the present invention. The secondary battery may be a cylindrical battery using a can, a prismatic battery, a pouch-type battery, or a coin-type battery.

Advantageous Effects

Since an electrode active material having a core-shell structure according to the present invention uses, as a component for the shell, a polymer or an oligomer having a glass transition temperature of 25° C. or less when impregnated with an electrolyte, it is possible to prevent initial capacity reduction by suppressing the formation of an SEI layer during initial charge of a battery, and to maximize a capacity of an electrode active material.

Also, in the present invention, the shell can have sufficient elasticity in an operating temperature range of a battery, and thus is not easily broken down by a core volume change caused by charge/discharge of a battery, and thereby can contribute to improvement of battery stability.

Also, the electrode active material having a core-shell structure according to the present invention, especially a metal(loid) based electrode active material having a core-shell structure can have a slightly higher electric capacity, compared to a conventional electrode active material, especially a conventional metal (loid) based electrode active material, and can minimize gas generation during charge/discharge. Accordingly, through the present invention, it is possible to achieve a high capacity battery, and to solve stability reduction caused by the use of a conventional metal(loid) based electrode active material.

BEST MODE

Reference will now be made in detail to the preferred embodiments of the present invention. However, the following examples are illustrative only, and the scope of the present invention is not limited thereto.

Example 1

1-1. Preparation of an Electrode Active Material 0.1 parts by weight of polyethylene glycol methyl ether was dissolved in 100 parts by weight of ethyl alcohol, and graphite powder was added to the solution in an amount of 10 parts by weight per 100 parts by weight: of the solution, followed by stirring for 12 hours. Then, the mixed solution was filtered to obtain a core-shell structure electrode active material including polyethylene glycol methyl ether coated on graphite powder with a thickness of about 25 nm.

1-2. Preparation of an Electrode

The electrode active material obtained from Example 1-1, SBR(styrene butadiene rubber), and CMC(carboxy methyl cellulose) were mixed in a weight ratio of 96:2:2, and water was added thereto to prepare slurry. The prepared slurry was applied to copper foil with a thickness of 10 μm, and a drying process was carried to obtain an electrode, followed by roll-press.

1-3. Manufacture of a Battery

The electrode obtained from Example 1-2, and a lithium metal thin film as a counter electrode were used, a polyethylene separator was interposed between the anode and the cathode, and an electrolyte was injected thereto to obtain a secondary battery. Herein, as the electrolyte, 1M $LiPF_6$ solution including EC/EMC (ethyl carbonate: diethyl carbonate (DEC)=1:2 in a volume ratio) was used.

Comparative Example 1

A secondary battery was obtained in the same manner as described in Example 1-3, except that an electrode including conventional graphite powder (which is not coated with polyethylene glycol methyl ether) as an electrode active material was used instead of the electrode obtained from Example 1-2.

Experimental Example 1

Measurement of Glass Transition Temperature

The glass transition temperature was measured by using DSC (Differential Scanning calorimeter), which was carried out by impregnating polyethylene glycol methyl ether used in Example 1-1 with an electrolyte, and raising temperature from −100° C. to 150° C. at a rate of 5° C. per minute. Herein, as the electrolyte, the same 1M $LiPF_6$ solution including EC/EMC (ethyl carbonate: diethyl carbonate (DEC)=1:2 in a volume ratio) as that of Example 1-3 was used.

As a result, the measured value of the glass transition temperature of polyethylene glycol methyl ether was −56° C.

Experimental Example 2

Test on Battery Performance

Figure 1:
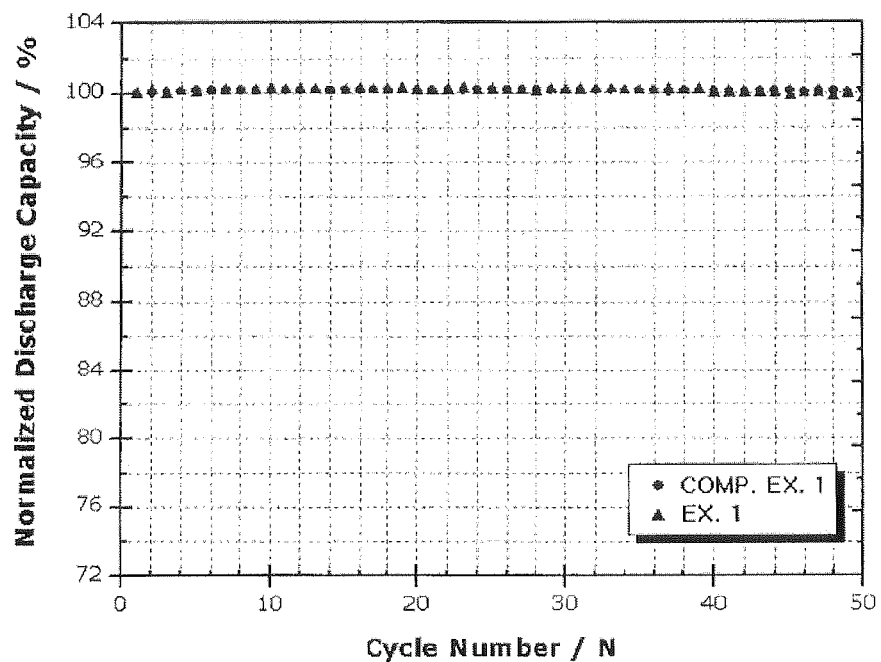
FIG. 1 is a graph showing a discharge capacity maintenance ratio with respect to cycles, which was measured in Experimental Example 2.
Figure 2:
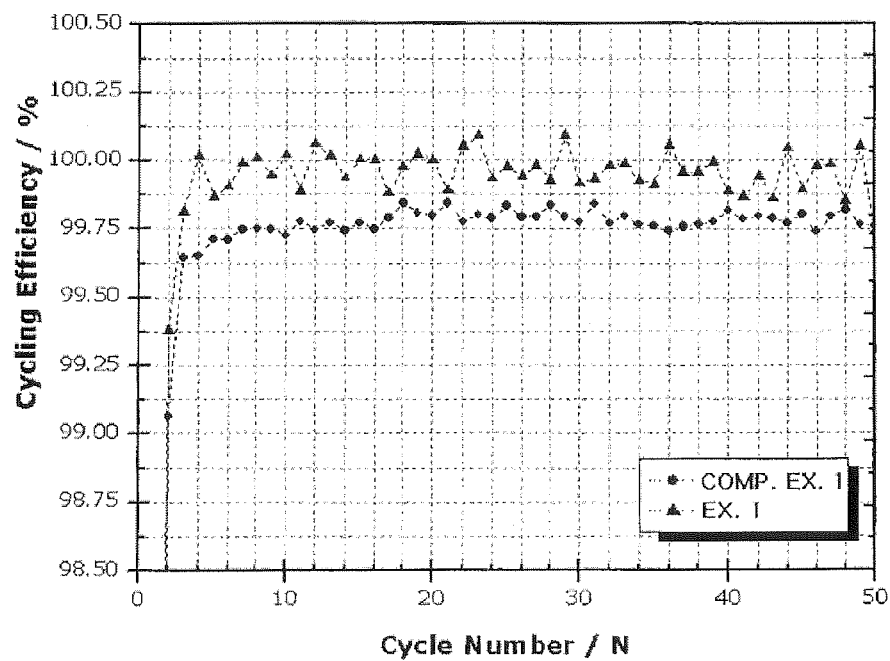
FIG. 2 is a graph showing charge/discharge efficiency with respect to cycles, which was measured in Experimental Example 2.

Each of the secondary batteries obtained from Example 1 and Comparative Example 1 was charged at a rate of 0.1 C up to 5 mV and charged to a current of 0.005 C at 5 mV, and then was discharged to 1V at a rate of 0.1 C, at 25° C. This charge/discharge was carried out twice. Then, charge/discharge was carried out at 0.5 C/0.5 C in the same manner as described above, and the discharge capacity maintenance ratio and charge/discharge efficiency according to a charge/discharge cycle were measured. Table 1 and FIGS. 1 and 2 show the results.

TABLE 1

| | | Exp. 1 | Comp. Exp. 1 |
|---|---|---|---|
| Charge/discharge efficiency | $1^{st}$. Eff. (%) | 94.3 | 93 |
| | $50^{th}$. Eff. (%) | 100 | 100 |

As a result, compared to the battery obtained from Comparative Example 1, which used a conventional anode active material (graphite powder), the battery obtained from Example 1, which used the core-shell structure anode active material according to the present invention, showed higher charge/discharge efficiency during an initial charge/discharge cycle. Then, during following cycles, an initial capacity and charge/discharge efficiency of the battery obtained from Example 1 was similar to the battery obtained from Comparative Example 1 (see FIGS. 1 and 2).

Accordingly, it can be seen from the results that when the core-shell structure anode active material according to the present invention is used, formation of an SEI layer is suppressed during initial charge of a battery, thereby preventing decrease of an initial capacity. Also, it is determined that the movement of lithium ions is not prevented by a shell, and thus battery performance is not degraded.

Example 2

2-1. Preparation of an Electrode Active Material 0.1 parts by weight of polyethylene glycol methyl ether was dissolved in 100 parts by weight of ethyl alcohol, and a Si/graphite composite particle (diameter: 20 μm) was added to the solution in an amount of 10 parts by weight per 100 parts by weight of the solution, followed by stirring for 12 hours, Then, the mixed solution was filtered to obtain a core-shell structure Si/graphite composite electrode active material coated with polyethylene glycol methyl ether with a thickness of about 25 nm.

A core-shell structure graphite-based electrode active material was prepared in the same manner as described in Example 2-1, except that graphite powder was used, instead of the Si/graphite composite particle.

2-2. Preparation of an Electrode

The core-shell structure Si/graphite composite electrode active material obtained from Example 2-1, the core-shell structure graphite-based electrode active material, the SBR (styrene butadiene rubber), and CMC(carboxy methyl cellulose) were mixed in a weight ratio of 4.8:91.2:2:2, and water was added thereto to prepare slurry. The prepared slurry was applied to copper foil with a thickness of 10 μm, and a drying process was carried to obtain an electrode, followed by roll-press.

2-3. Manufacture of a Battery

The electrode obtained from Example 2-2, and a lithium metal thin film as a counter electrode were used, a polyethylene separator was interposed between both electrodes, and an electrolyte was injected thereto to obtain a secondary battery. Herein, as the electrolyte, 1M $LiPF_6$ solution including EC/EMC (ethyl carbonate: diethyl carbonate (DEC)=1:2 in a volume ratio) was used.

Example 3

An electrode active material, an electrode, and a secondary battery were manufactured in the same manner as described in Example 2, except that polyethylene glycol methyl ether was used in an amount of 0.5 parts by weight with respect to 100 parts by weight of ethyl alcohol, to prepare a core-shell structure Si/graphite composite electrode active material coated with the polyethylene glycol methyl ether with a thickness of about 43 nm.

Comparative Example 2

A secondary battery was manufactured in the same manner as described in Example 2-3, except that in preparing an electrode, a conventional Si/graphite composite particle was used as an electrode active material, instead of the core-shell structure Si/graphite composite electrode active material and the core-shell structure graphite-based electrode active material obtained from Example 2-1.

Experimental Example 3

Test on Battery Performance

Figure 3:
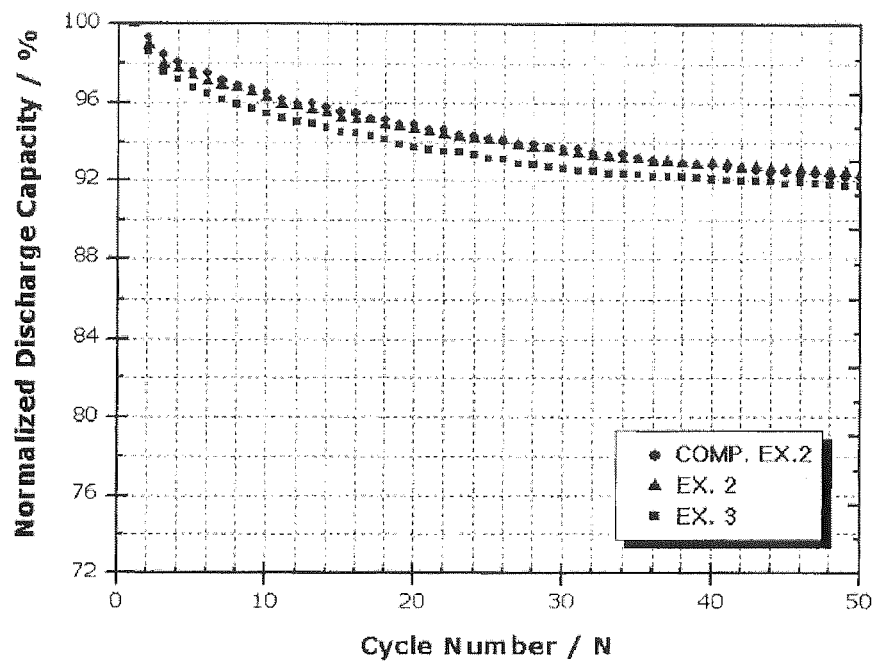
FIG. 3 is a graph showing a discharge capacity maintenance ratio with respect to cycles, which was measured in Experimental Example 3.
Figure 4:
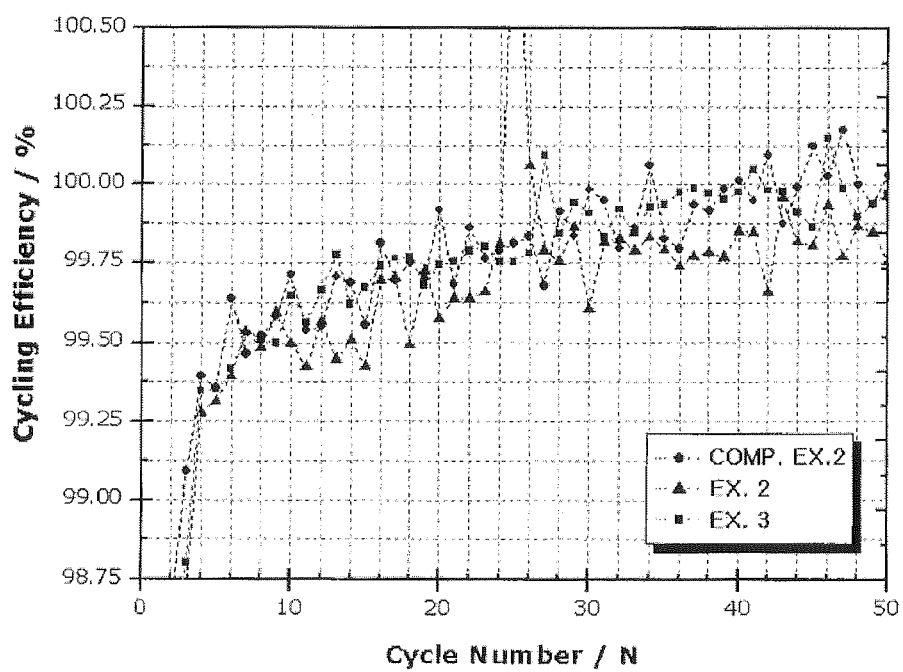
FIG. 4 is a graph showing charge/discharge efficiency with respect to cycles, which was measured in Experimental Example 3.

Each of the secondary batteries obtained from Examples 2 and 3, and Comparative Example 2 was charged at a rate of 0.1 C up to 5 mV, and charged to a current of 0.005 C at 5 mV, and then was discharged to 1V at a rate of 0.1 C, at 25° C. This charge/discharge was carried out twice. Then, charge/discharge was carried out at 0.5 C/0.5 C in the same manner as described above. Herein, after 50 cycles, an increase ratio of thickness of the battery was measured, and the results were noted in Table 2. Also, the discharge capacity maintenance ratio and charge/discharge efficiency according to charge/discharge cycle were measured. Table 3 and FIGS. 3 and 4 show the results.

TABLE 2

|  | Initial electrode thickness (μm) | Electrode thickness after 50 cycles (μm) | Thickness increase ratio after 50 cycles (%) |
|---|---|---|---|
| Exp. 2 | 66 | 86 | 26.5 |
| Exp. 3 | 68 | 80 | 18.2 |
| Comparative Exp. 2 | 62 | 90 | 45.6 |

TABLE 3

|  | $1^{st}$. Charge capacity (mA) | $1^{st}$. Discharge capacity (mA) | $1^{st}$. Charge/discharge efficiency (%) |
|---|---|---|---|
| Exp. 2 | 452.7 | 414.8 | 91.3 |
| Exp. 3 | 454.8 | 415.8 | 91.5 |
| Comparative Exp. 2 | 465.5 | 419.1 | 90.1 |

As a result, each of the batteries obtained from Examples 2 and 3, which used the core-shell structure Si/graphite composite electrode active material according to the present invention, showed an electrode thickness increase ratio 1.7~2.5 times lower compared to the battery obtained from Comparative Example 2, which used a conventional Si/graphite composite electrode active material (see Table 2). Also, the initial charge/discharge efficiency of the battery obtained from Example 2 was slightly higher than that of the battery obtained from Comparative Example 2 (see Table 3).

Accordingly, it can be seen from the results that the core-shell structure metal(loid) anode active material according to the present invention can show an electricity capacity higher than a conventional metal(loid) electrode active material while improving the stability of a battery by significantly reducing gas generation during charge/discharge.

Meanwhile, as shown in FIGS. 3 and 4, the battery according to the present invention (obtained from Example 2) showed similar performance to the battery obtained from Comparative Example 2, from the standpoint of cyclability and charge/discharge efficiency. Accordingly, it is determined, that introduction of the core-shell structure electrode active material (especially, shell) according to the present invention does not cause degradation of battery performance.

Example 4

4-1. Preparation of an Electrode Active Material 0.1 parts by weight of polyethylene glycol methyl ether was dissolved in 100 parts by weight of ethyl alcohol, and a SiC/graphite composite particle (diameter: 20 μm) was added to the solution in an amount of 10 parts by weight per 100 parts by weight of the solution, followed by stirring for 12 hours. Then, the mixed solution was filtered to obtain a core-shell structure SiO/graphite composite electrode active material coated with polyethylene glycol methyl ether with a thickness of about 25 nm.

A core-shell structure graphite-based electrode active material was prepared in the same manner as described in Example 4-1, except that graphite powder was used, instead of the SiO/graphite composite particle.

4-2. Preparation of an Electrode

The core-shell structure SiO/graphite composite electrode active material obtained from Example 4-1, the core-shell structure graphite-based electrode active material, SBR(styrene butadiene rubber), and CMC(carboxy methyl cellulose) were mixed in a weight ratio of 14.6:82.4:1.5:1.5, and water was added thereto to prepare slurry. The prepared slurry was applied to copper foil with a thickness of 10 μm, and a drying process was carried to obtain an electrode, followed by roll-press.

4-3. Manufacture of a Battery

A secondary battery was manufactured in the same manner as described in Example 2-3, except that the electrode obtained from Example 4-2 was used instead of the electrode obtained from Example 2-2.

Comparative Example 3

A secondary battery was manufactured in the same manner as described in Example 4-3, except that in preparing an electrode, a conventional Sb/graphite composite particle was used as an electrode active material instead of the core-shell structure SiO/graphite composite electrode active material and the core-shell structure graphite-based electrode active material obtained from Example 4-1.

Experimental Example 4

Test on Battery Performance

Figure 5:
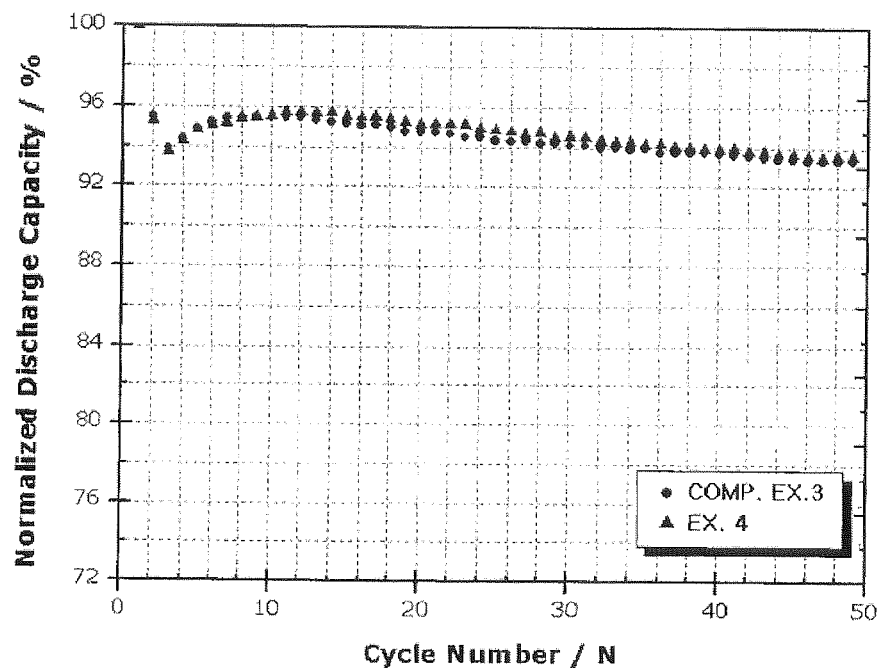
FIG. 5 is a graph showing a discharge capacity maintenance ratio with respect to cycles, which was measured in Experimental Example 4.
Figure 6:
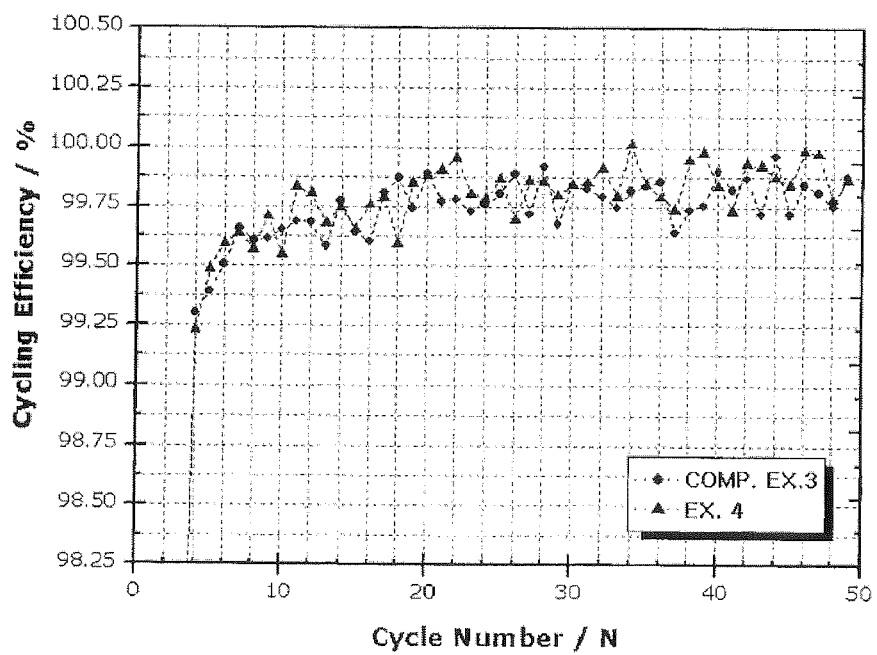
FIG. 6 is a graph showing charge/discharge efficiency with respect to cycles, which was measured in Experimental Example 4.

Each of the secondary batteries obtained from Example 4, and Comparative Example 3 was charged at a rate of 0.1 C up to 5 mV, and charged to a current of 0.0050 at 5 mV, and then was discharged to 1.5V at a rate of 0.10, at 25° C. This charge/discharge was carried out twice. Then, charge/discharge was carried out at 0.5 C/0.5 C in the same manner as described above. Herein, after 50 cycles, an increase ratio of thickness of the battery was measured, and the results were noted in Table 4. Also, the discharge capacity maintenance ratio and charge/discharge efficiency according to a charge/discharge cycle were measured. Table 5 and FIGS. 5 and 6 show the results.

TABLE 4

|  | Initial electrode thickness (μm) | Electrode thickness after 50 cycles (μm) | Thickness increase ratio after 50 cycles (%) |
|---|---|---|---|
| Exp. 4 | 65 | 80 | 31.1 |
| Comparative Exp. 3 | 64 | 83 | 41.0 |

TABLE 5

| | 1st. Charge capacity (mAh/g) | 1st. Discharge capacity (mAh/g) | 1st. Charge/discharge efficiency (%) |
|---|---|---|---|
| Exp. 4 | 661.5 | 535.8 | 81.0 |
| Comparative Exp. 3 | 666.8 | 536.2 | 80.3 |

As a result, each of the batteries obtained from Example 4, which used the core-shell structure SiO/graphite composite electrode active material according to the present invention, showed an electrode thickness increase ratio about 1.3 times lower compared to the battery obtained from Comparative Example 3, which used a conventional. SiO/graphite composite electrode active material (see Table 4). Also, the initial charge/discharge efficiency of the battery obtained from Example 4 was slightly higher than that of the battery obtained from Comparative Example 3 (see Table 5).

Meanwhile, as shown in FIGS. 5 and 6, the battery according to the present invention (obtained from Example 4) showed similar performance to the battery obtained from Comparative Example 3, from the standpoint of cyclability and charge/discharge efficiency. Accordingly, it is determined that introduction of metal oxide-based anode active material, such as the core-shell structure electrode active material (especially, shell) according to the present invention does not cause degradation of battery performance.

The invention claimed is:

1. An anode active material having a core-shell structure, which comprises
   (a) a core capable of intercalating and deintercalating lithium ions; and
   (b) a shell comprising a polymer or an oligomer having a glass transition temperature of 25° C. or less when impregnated with an electrolyte, wherein a surface of the core is coated with the shell,
   wherein the core (a) comprises (i) a metal or a metalloid selected from the group including Si, Al, Sn, Sb, Bi, As, Ge, and Pb; (ii) an oxide of the metal or metalloid selected from the group (i); (iii) an alloy of at least two metals or metalloids selected from the group (i); (iv) a composite of a carbon material with the metal or metalloid selected from the group (i); or (v) a composite of a carbon material with the oxide of the metal or metalloid selected from the group (i),
   wherein the shell (b) comprises the polymer or oligomer selected from the group consisting of polyethylene glycol, polyethylene oxide, polyethylene glycol methyl ether, polyethylene glycol dimethyl ether, poly propylene oxide, polyethylene, polypropylene, polyisobutylene, and polyvinylidene chloride, and
   wherein the shell (b) has a thickness ranging from 0.001 μm to 1 μm.

2. The electrode active material as claimed in claim 1, wherein the shell (b) comprises the polymer or oligomer having a glass transition temperature of −20° C. or less when impregnated with an electrolyte.

3. An anode comprising the electrode active material as claimed in claim 1.

4. A secondary battery comprising the anode as claimed in claim 3.

* * * * *